United States Patent [19]

Shedigian

[11] Patent Number: 4,642,731
[45] Date of Patent: Feb. 10, 1987

[54] DIELECTRIC FLUID FOR A CAPACITOR

[75] Inventor: Vandos Shedigian, Indianapolis, Ind.

[73] Assignee: Emhart Industries, Inc., Indianapolis, Ind.

[21] Appl. No.: 875,055

[22] Filed: Jun. 16, 1986

[51] Int. Cl.⁴ ............................................. H01G 4/22
[52] U.S. Cl. .................................... 361/319; 252/567
[58] Field of Search ...................... 252/62.2, 567, 578, 252/579; 361/314, 315, 319, 323, 433 E, 433 L, 433 J

[56] References Cited

U.S. PATENT DOCUMENTS

| | | | |
|---|---|---|---|
| 3,724,043 | 4/1973 | Eustance | 252/567 X |
| 4,117,579 | 10/1978 | Shaw et al. | 361/319 X |
| 4,420,791 | 12/1983 | Shedigian | 361/319 |
| 4,459,637 | 7/1984 | Shedigian | 361/323 X |
| 4,521,826 | 6/1985 | Shedigian et al. | 252/567 X |
| 4,536,331 | 8/1985 | Shedigian | 252/579 |
| 4,538,208 | 8/1985 | Shedigian | 361/319 |

Primary Examiner—Donald A. Griffin
Attorney, Agent, or Firm—Robert F. Meyer; Carl A. Forest

[57] ABSTRACT

A metallized film capacitor having a dielectric fluid comprising glyceryl triacetate and about 30 to 90 vol. percent of epoxidized soybean oil.

5 Claims, 4 Drawing Figures

DIELECTRIC FLUID FOR A CAPACITOR

BACKGROUND OF THE INVENTION

1. Field of the Invention

The invention in general relates to dielectric fluids for capacitors and more particularly to such fluids that are used in capacitors having metallized electrodes formed on plastic film.

2. Description of the Prior Art

The present invention relates to electrical capacitors which are constructed from a pair of metallized plastic film sheets. A thin layer of a metal, generally aluminum, is deposited on the surface of one side of each sheet and serves as an electrode. The plastic forms the dielectric. Preferably, the plastic is polypropylene, though other plastics, such as polyester, polycarbonate, polystyrene, polysulfone and polyethylene terephthalate may be used. Such capacitors are generally enclosed in a can which is filled with a dielectric fluid capable of operating under high voltage stress, as for example above 1350 volts/mil. The main problem in such capacitors is capacitance loss during operation. Some causes of capacitance loss are the presence of air or other gas between the electrodes and the absorption of dielectric fluid by the film which causes it to swell and lose dielectric strength. Air may be excluded from between the film layers by tightly winding the film and heat treating it. However, this does not entirely prevent dielectric fluid from entering the film roll. Also, gas may be generated by high stress electrical discharges in the capacitor. For these reasons, it is desirable that the dielectric fluid be highly viscous to impede its entering the rolled film, that its propensity to wet the film is low thus reducing spreading, that its tendency to swell the film is low, and that its capability of absorbing gas is high.

Glyceryl triacetate is known to be an excellent dielectric fluid in metallized film capacitors due to its relatively low wetting and swelling characteristics. See U.S. Pat. No. 4,459,637 issued to the present inventor. However, this fluid also has low viscosity and poor gas absorption. It is known to add from 0.01% to 10% (usually the lower percentages) of an antioxidant, such as epoxidized soybean oil, to the dielectric fluid to increase gas absorptivity. See Canadian Pat. No. 1,044,004 issued to Takashima Kazushige. It is also known that epoxidized soybean oil alone may be used as a dielectric fluid (U.S. Pat. No. 4,422,962 issued to Stanley W. Cichanowski); however, the capacitance loss factor of epoxidized soybean oil is known to be considerably higher than that of glyceryl triacetate, for example 4.2% for the former as compared to 2.7% for the latter.

SUMMARY OF THE INVENTION

It is an object of the invention to provide a dielectric fluid and a metallized film capacitor in which the capacitance loss is minimized.

I have discovered that, although epoxidized soybean oil has a capacitance loss of about 4.2% over 2000 hours of use and glyceryl triacetate has a capacitance loss of about 2.7 over the same period, a combination of about 60% glyceryl triacetate and 40% epoxidized soybean oil has a capacitance loss of only 0.7 for 2000 hours.

The invention provides a capacitor dielectric fluid comprising glyceryl triacetate and between about 30 to 90 vol. percent of epoxidized soybean oil. In another aspect, it provides a capacitor comprising: a housing; a pair of convolutely wound metallized film electrodes enclosed within the housing, and a dielectric liquid excluding gasses from said housing and including glyceryl triacetate and about 30 to 90 vol. percent of epoxidized soybean oil. Other features, objects and advantages of the invention will become apparent from the following detailed description when read in conjunction with the accompanying drawings.

BRIEF DESCRIPTION OF THE DRAWINGS

The present invention is illustratively shown and described in respect to the accompanying drawings in which.

PREFERRED EMBODIMENT

Figure 1:
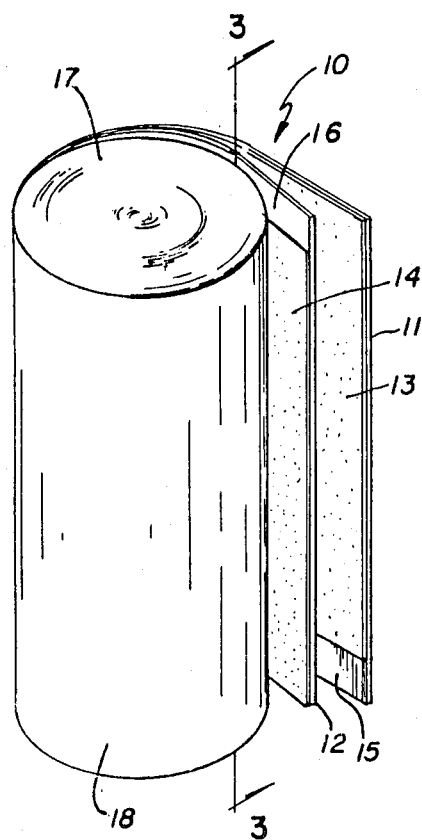
FIG. 1 is a perspective view of a convolutely wound metallized film capacitor body which is partially unwound to show the dielectric plastic film and metallized foil electrode structure.

Referring now to FIG. 1, there is illustrated a convolutely wound ac capacitor body 10. The capacitor body 10 includes a pair of dielectric plastic film layers 11 and 12 and overlying metallized electrodes 13 and 14, respectively. The dielectric plastic film layers 11 and 12 are metallized in such a manner as to provide margins 15 and 16 which are free of metal. Such margins are useful in helping to prevent electrical short circuits between the metallized electrodes at the ends of the capacitor body 10. In convolutely winding the capacitor body 10, the metallized electrode 13 overlying the plastic film 11 is laterally offset with respect to the metallized electrode 14 overlying the plastic film 12 so that metallized electrode 13 and margin 16 appear at end 17 of the capacitor body and so that metallized electrode 14 and margin 15 appear at end 18 of the capacitor body.

Figure 2:
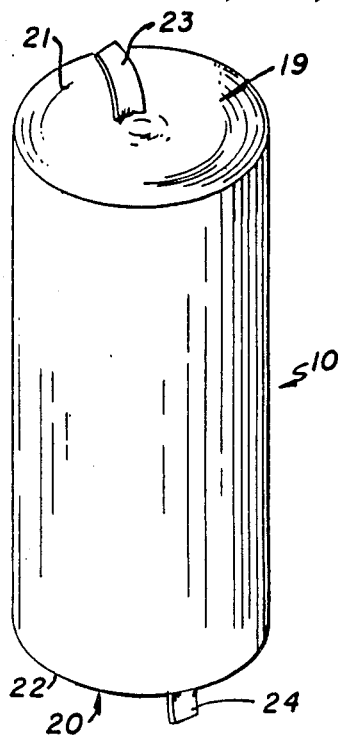
FIG. 2 is a perspective view of the capacitor body of FIG. 1 to which terminal leads are attached.

As shown in FIG. 2, suitable terminal leads 19 and 20 are attached to the ends 17 and 18, respectively, of the capacitor body 10 using any suitable attachment process. The attachment process must not result in electrically conductive material penetrating into the capacitor body 10 to cause the metallized electrode at the capacitor body edge to electrically short the other metallized electrode. An acceptable attachment process includes spraying the ends 17 and 18 of the capacitor body 10 with lead, a lead alloy, aluminum, an aluminum alloy, zinc, a zinc alloy, tin, a tin alloy, nickel, a nickel alloy and the like. The metal material at the ends of the capacitor body 10 are indicated by the reference numerals 21 and 22. Lead strips 23 and 24 are suitably attached to the metal material as shown in FIG. 2. A suitable lead strip material is solder coated copper.

Figure 3:
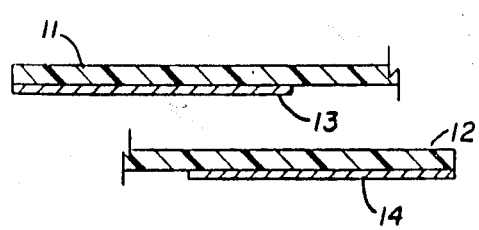
FIG. 3 is a partial sectional view taken across lines 3—3 of FIG. 1.

FIG. 3 is a sectional view taken along the line 3—3 of FIG. 1 but limited to a small section of the capacitor body 10. In FIG. 3, the plastic film layers 11 and 12 and their respective overlying metallized electrodes 13 and 14 are arranged in the same manner as shown in FIG. 1.

Metallized electrode 13 is integrally jointed to the plastic film 11 whereas metallized electrode 14 is integrally jointed to the plastic film 12. FIG. 3 shows a metallized electrode on but one side of the plastic film;

however, the metallized electrode layers may be deposited on both sides of the plastic film. The application of the metallized electrodes 13 and 14 to their respective plastic film may be accomplished by any suitable process such as vapor, chemical or other known metal deposition process. For example, aluminum can be deposited over the dielectric layer to have a resistivity of about 1 to about 4 ohms per square inch. Depending on the specific operating characteristics desired, the resistivity of each metallized electrode can be more than 4 ohms per square inch or less than 1 ohm per square inch. Generally speaking, a capacitor with high resistivity, metallized electrodes tends to suffer a decrease in its capacitance more readily than does a capacitor with lower resistivity electrodes. On the other hand, a capacitor with low resistivity metallized electrodes may not clear or self-heal. The low resistivity metallized electrode capacitor would tend to fail if the dielectric plastic film suffers a breakdown, since the thicker metallized layer wound require more energy to produce vaporization of the electrodes around any such breakdown site. Metals other than aluminum may be used as the metallized electrodes provided they do not disintegrate dielectric plastic film and have the desired resistivity. Such other metals include nickel, zinc, tin and the like.

The dielectric plastic films or layers 11 and 12 should have high dielectric strength, low dissipation factor to prevent thermal runaway, broad temperature range capabilities resistance to the dielectric fluid, and freedom from pinholes and conductive particles. The dielectric film layers 11 and 12 may be any suitable homogenous polymer or plastic material such as polyester, polyethylene, polycarbonate, polystyrene, polysulfone, polyethylene terephthalate and, preferably, the polyolefins, particularly polypropylene. Polyester is not as desirable as polypropylene because in ac capacitors it tends to generate too much heat at desired operating voltage stresses. The upper operating temperature of polyethylene is much lower than that of polypropylene. Polycarbonate, polystyrene and polysulfone are not as solvent resistant as polypropylene.

The presently most preferred polypropylene is biaxially oriented polypropylene for it tends to meet all desirable specifications. Biaxially oriented polypropylene is preferred because it permits an ac capacitor to operate at high KVAR (kilovolt-ampere reactive) per unit volume due to its high dielectric strength and low dissipation factor and it imbibes little, if any, of the dielectric fluid of this invention.

Figure 4:
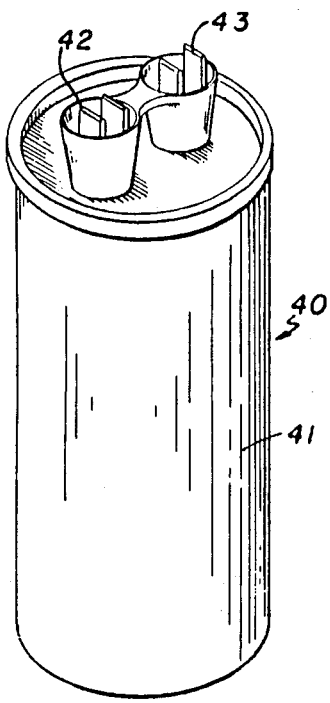
FIG. 4 is a perspective view of the capacitor body of FIGS. 1 and 2 enclosed in a suitable housing.

In FIG. 4, a capacitor body 10 is preferably sealed in a can or housing 40 to form a capacitor 41. Capacitor 41 includes the metal housing or can 40 and terminals 42 and 43. The capacitor body 10 is contained within the housing 40 and terminal lead 23 makes electrical contact with terminal 42 and the remaining terminal lead 24 makes electrical contact with terminal 43.

The dielectric liquid of the present invention fills the housing 40 to exclude air and other gasses therefrom. The liquid includes glyceryl triacetate, epoxidized soybean oil, and zero to about 10 weight percent of an antioxidant. Glyceryl triacetate is available from the Eastman Kodak Company as KODAFLEX Triacetin.

An antioxidant is included in the dielectric liquid to help keep the dissipation factor of the liquid lower for a longer period of time. The preferred amount and type of antioxidant is about 0.1 wt. percent butylated hydroxytoluene (BHT) but may be about 0.01 to about 10 wt. percent of phenols such as phenolic and di-tert-butyl-p-cresol. Other antioxidants known in the art which do not significantly increase the dissipation factor of the dielectric fluid may also be used. Mixtures of antioxidants are also contemplated.

It is widely known that epoxies act as acid scavengers and ionic conductive traps in various dielectric fluids. they also have the ability to clean up thermal, chemical and electrical decompositions within capacitors during operation. Usually several percent or less is added to fluids. However, it has been found that with the addition of 30 to 90 volume % of epoxidized soybean oil the original capacitance value is retained by the capacitor for surprisingly long periods of use. It is believed that this is due to the large increase in the viscosity with the addition of this quantity of epoxidized soybean oil. The increase in viscosity prevents or slows down the penetration of the fluid through the ends of the roll. The viscosity increase is shown in Table I

TABLE I

| Fluid | Viscosity-Centistokes 25° C. |
|---|---|
| Glyceryl Triacetate | 15 |
| 60 Vol % Glyceryl Triacetate + 40 Vol % Epoxidized Soybean Oil | 55 |

It is believed that so long as the percentages of epoxidized soybean oil added are high enough to result in a greatly increased viscosity as compared to glyceryl triacetate alone, enhanced performance should result.

During manufacturing, the capacitor body 10 of FIG. 1 is constructed by tightly winding the metallized polypropylene film on a hard roll to stretch the film in the roll wound direction. Terminal strips 23 and 24 are attached and the capacitor body 10 is enclosed in the housing 40. The capacitor is then heat treated in a vacuum for a period of time to cause the shrinkage of the polypropylene film in the roll wound direction and the resulting removal of air from the roll. Prior to this, the dielectric liquid described above has been prepared and refined by passing it through a Fuller's earth column and likewise heating it in a vacuum to help remove dissolved gasses. The heated liquid is then introduced into the capacitor 41 while still under vacuum condition to promote displacement of every possible bit of gas from the housing 41 by the dielectric liquid. After the capacitor has cooled, the hole may be easily sealed with solder.

The advantage of the glyceryl triacetate plus large percentages of epoxidized soybean oil were compared by constructing two sets of identical metallized PP film capacitors and impregnating them with these fluids: One with glyceryl triacetate and the second with 60 Vol % glyceryl triacetate plus 40 Vol % epoxidized soybean oil; both fluids included 0.1% butylated hydroxytoluene (BHT) as antioxidant. The fluids were purified by conventional methods, capacitors and fluids were degassed under vacuum at elevated temperatures, filled and soldered. The results are shown in Table II.

TABLE II

| Capacitance Loss in Metallized Polypropylene Film Capacitors Rated 440 VAC/15 uF (10 microns thick) on Life Test 500 VAC, 2000 Hrs., 80° C. | | | |
|---|---|---|---|
| Fluid | % Capacitance Loss (% Delta C) | Tested | Failed | Hours |
| Glyceryl Triacetate | 2.7 | 4 | 1 | 500 |
| 60 Vol % Glyceryl | 0.7 | 6 | 2 | 1500 |

TABLE II-continued

Capacitance Loss in Metallized Polypropylene Film
Capacitors Rated 440 VAC/15 uF (10 microns thick)
on Life Test 500 VAC, 2000 Hrs., 80° C.

| Fluid | % Capacitance Loss (% Delta C) | Tested | Failed | Hours |
|---|---|---|---|---|
| Triacetate + 40 Vol % Epoxidized Soybean Oil | | | | |

Table II clearly illustrates 3 to 4 times higher capacitance loss when impregnated with glyceryl triacetate alone compared with the addition of 40 Vol % epoxidized soybean oil. This nearly four-fold decrease in capacitance loss is particularly surprising since a previous identical test with epoxidized soybean oil alone (with the same 0.1% BHT as antioxidant) resulted in a percent capacitance loss of 4.2 over 2000 hours (with no failures for 6 capacitors tested).

The dielectric liquid of this invention has little or no tendency to permeate plastic film such as polypropylene, has high electrical strength, is easily purifiable, maintains its good electrical properties at high operating temperatures, and has low volatility and toxicity.

A novel dielectric fluid for use in metallized film capacitors has been disclosed. The above descriptions of the invention are intended to be taken in an illustrative and not a limiting sense. It is evident that those skilled in the art may now make many uses and modifications of the specific embodiment described without departing from the inventive concepts. For example, other substances may be added to enhance or modify one or more properties of dielectric fluid and capacitors. Or alternative forms of capacitor construction may be used. Consequently, the invention is to be construed as embracing each and every novel feature and novel combination of features present in the dielectric fluid and capacitor described.

What is claimed is:

1. In a capacitor, a dielectric fluid comprising glyceryl triacetate and between about 30 to 90 vol. percent epoxidized soybean oil.

2. The dielectric fluid of claim 1 wherein the vol. percent of said glyceryl triacetate is about 60% and the vol. percent of said soybean oil is about 40%.

3. A capacitor comprising:
   a housing;
   a pair of convolutely wound metallized film electrodes enclosed within said housing; and
   a dielectric liquid excluding gasses from said housing and including glyceryl triacetate and about 30 to 90 vol. percent of epoxidized soybean oil.

4. The capacitor of claim 3, wherein the vol. percent of said glyceryl triacetate is bout 60% and the vol. percent of said soybean oil is about 40%.

5. The capacitor of claim 3, wherein said metallized film electrodes are formed on a plastic film selected from the group consisting of polypropylene, polyester, polycarbonate, polystyrene, polysulfone and polyethylene terephthalate.

* * * * *